(12) United States Patent
Chapman

(10) Patent No.: US 8,657,901 B2
(45) Date of Patent: Feb. 25, 2014

(54) SEPARATION SYSTEM FOR SEPARATING PARTICLES OF FIRST FLUID FROM A FLOW OF A SECOND FLUID

(75) Inventor: Paul Chapman, Middlesbrough (GB)

(73) Assignee: Nifco UK Limited, Stockton-On-Tees (GB)

( * ) Notice: Subject to any disclaimer, the term of this patent is extended or adjusted under 35 U.S.C. 154(b) by 0 days.

(21) Appl. No.: 13/513,390

(22) PCT Filed: Dec. 2, 2010

(86) PCT No.: PCT/EP2010/068740
§ 371 (c)(1),
(2), (4) Date: Jul. 30, 2012

(87) PCT Pub. No.: WO2011/067336
PCT Pub. Date: Jun. 9, 2011

(65) Prior Publication Data
US 2013/0133299 A1   May 30, 2013

(30) Foreign Application Priority Data
Dec. 4, 2009 (EP) .................................. 09275121

(51) Int. Cl.
*B01D 45/00* (2006.01)
(52) U.S. Cl.
USPC ............... 55/343; 55/419; 55/418; 55/459.1; 55/385.3; 55/428; 55/429; 55/346

(58) Field of Classification Search
USPC ............ 55/419, 418, 459.1, 343, 385.3, 428, 55/429, 346
See application file for complete search history.

(56) References Cited

U.S. PATENT DOCUMENTS

| 5,427,685 | A | 6/1995 | Thorley |
| 5,914,049 | A | 6/1999 | Brauch et al. |
| 6,110,242 | A | 8/2000 | Young |
| 6,572,668 | B1 | 6/2003 | An et al. |
| 6,599,348 | B2 * | 7/2003 | Chosnek et al. ................ 95/271 |
| 2003/0057151 | A1 | 3/2003 | Kopec et al. |

FOREIGN PATENT DOCUMENTS

| DE | 199 23 600 A1 | 11/2000 |
| EP | 1 767 276 A1 | 3/2007 |

* cited by examiner

*Primary Examiner* — Dung H Bui
(74) *Attorney, Agent, or Firm* — Manabu Kanesaka

(57) ABSTRACT

Sparation system 250 for separating particles of a first fluid from a flow of a second fluid, wherein the first fluid has a higher density than the second fluid comprises holder means 252 and a separation chamber 254. A lid 256 is provided for separation chamber 254. A plurality of apparatuses 200 for coalescing particles of liquid dispersed in a gas flow are arranged to be disposed in the holder means 252 such that the outlets 210 of the apparatuses are arranged to direct coalesced particles of liquid in a gas flow to enter the separation chamber 254. The separation chamber 254 comprises a gas outlet 258 and a drain 260 arranged to enable particles of solid or liquid separated from gas in the separation chamber to exit the separation chamber 254.

14 Claims, 8 Drawing Sheets

SEPARATION SYSTEM FOR SEPARATING PARTICLES OF FIRST FLUID FROM A FLOW OF A SECOND FLUID

RELATED APPLICATIONS

The present application is National Phase of International Application No. PCT/EP2010/068740 filed Dec. 2, 2010, and claims priority from Europe Application No. 09275121.3, filed Dec. 4, 2009.

The present invention relates to a separation system for separating particles of a first fluid from a flow of a second fluid, wherein the first fluid has a higher density than the second fluid, and to an apparatus for coalescing particles of a first fluid entrained in a flow of a second fluid, wherein the first fluid has a higher density than the second fluid. The invention relates particularly, but not exclusively, to an apparatus for separating particles of oil dispersed in blow-by gases in internal combustion engines.

Internal combustion engines are governed by legislation which limits the emission of hydrocarbons and other derivatives of the combustion process to the atmosphere. One of the problems faced by manufacturers of internal combustion engines is how to manage the gases that leak past the pistons into the crankcase whilst the engine is running. These gases, which are known as blow-by gases, must be ventilated from the crankcase to prevent pressure build up. However, some legislation also requires that the blow-by gases are recycled into the inlet manifold of the engine.

This can be undesirable because the blow-by gases collect oil particles from the piston rings, crank bearings and windage from the crank. As much as possible of this oil needs to be removed from the blow-by gases before it enters the inlet manifold. Excess oil passed to the inlet manifold will cause unacceptable exhaust emissions, fouling of the inlet valve and increased engine oil consumption. Consequently, oil separators are required to separate oil particles dispersed in blow-by gases.

Referring to FIG. 1, a known type of oil separator is shown connected to the crankcase 2 of a cylinder of an internal combustion engine. Crankcase 2 comprises an oil sump 4 in which oil is held to lubricate the engine. Blow-by combustion gases leak past the piston 6 in the direction of arrow A. However, the pressure in crankcase 2 must be kept at or below atmospheric pressure and the crankcase therefore must be ventilated to enable the blow-by gases to escape. Consequently, the crankcase is ventilated by passage 8. An oil separator chamber 10 is connected to passage 8 such that blow-by gases enter separator chamber 10 in the direction of arrow B.

The oil can separate by simply falling out of the air under gravity. Alternatively, several baffles (not shown) may be provided in chamber 10 to enable the oil to impinge on the baffles to collect and then fall off. The oil then either returns to sump 4 or is collected in a separate reservoir. Separator chamber 10 has an outlet 12 leading back to inlet manifold 14 of the cylinder. Consequently, some of the oil is removed in chamber 10 such that air re-entering the inlet manifold 14 is suitable for use in combustion.

The oil separator shown in FIG. 1 suffers from the following drawbacks. Simply feeding blow-by gasses into a chamber and allowing oil to separate under gravity is not particularly efficient and increasingly tight emissions regulations mean that oil separators need to be made more efficient and remove a greater proportion of the oil. On the other hand, commercial and market demands mean that the manufacturing cost must be minimised. Also, there is a significant amount of oil in the form of very fine particles in the range of 1 to 2 microns and these are very difficult to remove from air flow. In the example of FIG. 1, this type of oil separator has been found to be effective only in removing particles having a size greater than 5 microns which is not sufficient.

Referring to FIG. 2, another type of known separator is a cyclone 20. Cyclone 20 comprises an inlet port 22 into which air is passed into a cyclone chamber 24. The air circulates and falls and oil drops are deposited by centrifugal force onto the walls of the chamber 24. Larger particles of oil also fall out under gravity. The oil collecting in the chamber is removed by a drain 26 having baffles 28 at the bottom of the chamber. Clean air rises in the manner of a vortex to an outlet 30.

Cyclones such as the example shown in FIG. 2 can be effective removing oil particles having a diameter of approximately two microns. However, such cyclones suffer from the following drawbacks. It is known that if you have a plurality of small cyclones, they will be more effective at separating smaller particles than a single large cyclone for the same pressure drop and air flow rate. However, designing and manufacturing multiple cyclones each with an inlet, outlet and drain can be complex and expensive. They can also be difficult to fit into the available space in an engine. For cost reasons, an oil separator is often incorporated into the cam cover. This means that the separator should ideally require relatively little height and fit in a shallow cubic volume. However, cyclones do not typically conform to this requirement.

US2003/0057151 describes a multicell cyclone having axial gas outlets.

Further examples of cyclonic separators for separating solids from gas and having axial gas outlets are described in U.S. Pat. No. 6,110,242 and WO00/49933. The cyclonic separators described in these documents have axial gas outlets to enable cleaned gas to exit. If the gas exits tangentially with the dust or other solids, the separation would not be accomplished.

EP1747054 describes an alternative to a cyclone. A separation device is described having flow-through tubes in which what are called worm like elements are disposed. In each flow path, a worm like element having an anti-clockwise pitch is arranged next to a worm like element having a clockwise pitch. The worm like elements are therefore arranged to twist the flow of air passing through the flow path 90 degrees in one direction and then twist the air flow 90 degrees in the other direction. The reversal of the rotation of air is intended to separate oil droplets from the air and coalesce oil droplets into larger particles which are then separated by a downstream separator and baffle plates.

The apparatus of EP1747054 suffers from the following drawbacks. In some circumstances, by causing quick reversal of a flow of air between the clockwise and anti-clockwise worm like elements, turbulence can be caused which tends to keep oil entrained in the air flow rather than separating the oil. The worm like elements can also cause a pressure drop which is undesirable. Finally, moulding small features like the worm like elements can be difficult.

Another solution to the above mentioned problems is proposed in U.S. Pat. No. 6,860,915. A three-stage separator is described for separating oil droplets from blow-by gases. The first stage is a preliminary separator which is simply a chamber with baffle plates. The second stage is a helical tube through which air flows in a helical path to cause oil droplets to impinge on the outer surface of the path. The third stage is a filter element.

The apparatus of U.S. Pat. No. 6,860,915 suffers from the drawbacks that it is complicated to manufacture and also requires a filter. The use of a filter is always undesirable because the filter becomes clogged and requires periodic replacement.

EP1767276 describes a cyclone apparatus having a preliminary swirling chamber used to accumulate debris before it is passed into a cyclone chamber for separation. This apparatus suffers from the drawback of having large dimensions and low efficiency.

Preferred embodiments of the present invention seek to overcome the above disadvantages of the prior art.

According to an aspect of the present invention, there is provided a separation system for separating particles of a first fluid from a flow of a second fluid, wherein the first fluid has a higher density than the second fluid, the system comprising:

a separation chamber for separating particles of the first fluid entrained from flow of the second fluid; and a plurality of apparatuses for coalescing particles of the first fluid entrained in a flow of the second fluid, each said apparatus comprising:

a housing;

an enclosure formed in the housing, the enclosure defining a first longitudinal axis and having at least one curved wall arranged to direct fluid flow along at least one said curved wall in a curved path;

a first inlet to the enclosure provided at a first location along the longitudinal axis for enabling introduction of a fluid flow substantially along a tangent to at least one said curved wall;

an outlet from the enclosure provided at a second location, remote from the first location, along the longitudinal axis for enabling exit of the fluid flow substantially along a tangent to at least one said curved wall, wherein the enclosure is arranged to direct fluid flow along the at least one curved wall between the first inlet and the outlet to cause particles of the first fluid to coalesce and exit the outlet, wherein the first fluid is entrained in a flow of the second fluid; and wherein each said apparatus is arranged in a configuration such that the respective outlet of each said apparatus directs coalesced particles of the first fluid in the fluid flow to enter the separation chamber to be separated from the second fluid.

This provides the advantage of a system that can be manufactured in a relatively straightforward manner by injection moulding of thermoplastics and can be used to coalesce and then separate out particles of a first fluid entrained in a flow of a second fluid, wherein the first fluid has a higher density than the second fluid. In particular, this apparatus can be used to coalesce small particles of liquid disposed in an aerosol and in particular small oil droplets having diameters of the order of one micron into larger particles which can then be easily removed from a flow of blow-by gases in an internal combustion engine.

The apparatus has been found to deposit oil droplets on the at least one curved surface of the enclosure and push the oil droplets around to the curved surface to the outlet along with the flow of gas. The outlet therefore produces a flow of gas and a steady stream of large oil droplets.

This system also provides the advantage that it requires no servicing, i.e. it does not require the changing of filters. This system also causes a minimum pressure drop to minimise the risk of excessive crank case pressure when used in an internal combustion engine. Furthermore, the system requires no power from the engine to cause oil drops to coalesce and then be separated.

This system also provides the advantage that it is scalable to suit engines of different sizes and power outputs and it can also be packaged easily into cam covers and other engine components.

At least one said apparatus for coalescing particles of the first fluid entrained in a flow of the second fluid may further comprise:

a second inlet to the enclosure provided at a third location along the longitudinal axis for enabling introduction of a fluid flow substantially along a tangent to at least one said curved wall;

wherein the outlet from the enclosure is provided at a second location along the longitudinal axis for exit of all fluid flowing in the enclosure substantially along a tangent to at least one said curved wall and the second location is between the first and third locations; and wherein the enclosure is arranged to direct fluid flow along the at least one curved wall between the first inlet and the outlet and between the second inlet and the outlet to cause particles of the first fluid to coalesce and exit the outlet, wherein the first fluid is entrained in a flow of the second fluid.

By providing two inlets to the enclosure and an outlet for all fluid between the two inlets along the longitudinal axis of the enclosure, this provides the advantage that air can be caused to move down two curved paths in the same volume such that twice the coalescing capability is given in a single enclosure. This arrangement is particularly advantageous because it is very straightforward to manufacture from injection moulding. A single outlet also provides a convenient and non-turbulent gas flow to a subsequent separation chamber.

The outlet may be located at the mid-point between the first and second inlets along the first longitudinal axis.

This provides the advantage of an arrangement that is straightforward to manufacture from injection moulding of thermoplastic materials that are commonly used to manufacture car engine parts. Also, the central outlet provides the advantage of reducing turbulence in the air flow along the enclosure.

A portion of at least one said curved wall may be substantially cylindrical.

In a preferred embodiment, the diameter of the cylinder defining said portion is less than 20 millimeters.

It has been found that such small diameters are capable of causing a curved air flow sufficient to remove small particles of solid or fluid down to a size of approximately 1 micron from an air flow.

Each said apparatus may be arranged to be mountable in the holder means in a stacked configuration.

This provides the advantage that the system can be scaled up or down to fit engines of different sizes by using different numbers of apparatuses feeding into a separation chamber.

At least one end of the enclosure formed in the housing of at least one said apparatus may be formed in an open configuration and is arranged to be closed off by at least one wall of the holder means.

This provides the advantage of simplifying manufacturing, particularly injection moulding of thermoplastics.

The system may further comprise biasing means disposed in the holder means, wherein the biasing means is arranged to bias at least one said apparatus against at least one wall of the holder.

This provides the advantage of providing an improved seal.

In a preferred embodiment, the separation chamber further comprises:

a fluid outlet arranged in the separation chamber; and a drain arranged to enable particles of the first fluid separated from the second fluid in the separation chamber to exit the separation chamber.

The separation chamber may have a second longitudinal axis and at least one second curved wall arranged to direct fluid flow along the at least one second curved wall in a curved path to cause at least partial separation of particles of the first fluid from the second fluid.

This provides the advantage of an apparatus that is particularly effective at removing oil from the blow-by gases of a combustion engine without the use of filters.

The outlet of at least one said apparatus may be profiled to match the curve of at least one said second curved wall.

This provides the advantage that particles will tend to run along the edge of the profiled outlet and then directly onto the wall of the separator chamber, minimising the chance of the particles becoming re-entrained in the airflow.

According to another aspect of the invention, there is provided an apparatus for coalescing particles of a first fluid entrained in a flow of a second fluid, wherein the first fluid has a higher density than the second fluid, the apparatus comprising:

a housing;

an enclosure formed in the housing, the enclosure defining a first longitudinal axis and having at least one curved wall arranged to direct fluid flow along at least one said curved wall in a curved path;

a first inlet to the enclosure provided at a first location along the longitudinal axis for enabling introduction of a fluid flow substantially along a tangent to at least one said curved wall;

an outlet from the enclosure provided at a second location along the longitudinal axis for exit of all fluid flowing in the enclosure substantially along a tangent to at least one said curved wall;

a second inlet to the enclosure provided at a third location along the longitudinal axis for enabling introduction of a fluid flow substantially along a tangent to at least one said curved wall, wherein the second location is between the first and third locations;

wherein the enclosure is arranged to direct fluid flow along the at least one curved wall between the first inlet and the outlet and between the second inlet and the outlet to cause particles of the first fluid to coalesce and exit the outlet, wherein the first fluid is entrained in a flow of the second fluid.

By providing two inlets to the enclosure and an outlet for all fluid flow between the two inlets along the longitudinal axis of the enclosure, this provides the advantage that fluid can be caused to move down two curved paths in the same volume such that twice the coalescing capability is given in a single enclosure. This arrangement is particularly advantageous because it is very straightforward to manufacture from injection moulding. A single outlet also provides a convenient and non-turbulent fluid flow to a subsequent separation chamber.

The outlet may be located at the mid-point between the first and second inlets along the first longitudinal axis.

A portion of at least one said curved wall may be substantially cylindrical.

The diameter of the cylinder defining said portion may be less than 20 millimeters.

At least one end of the enclosure formed in the housing of the apparatus may be formed in an open configuration and is arranged to be closed off by at least one wall of a holder means.

The outlet of the apparatus may be profiled to match the curve of a wall of a separation chamber.

Preferred embodiments of the present invention will now be described, by way of example only, and not in any limitative sense, with reference to the accompanying drawings in which.

Figure 3:
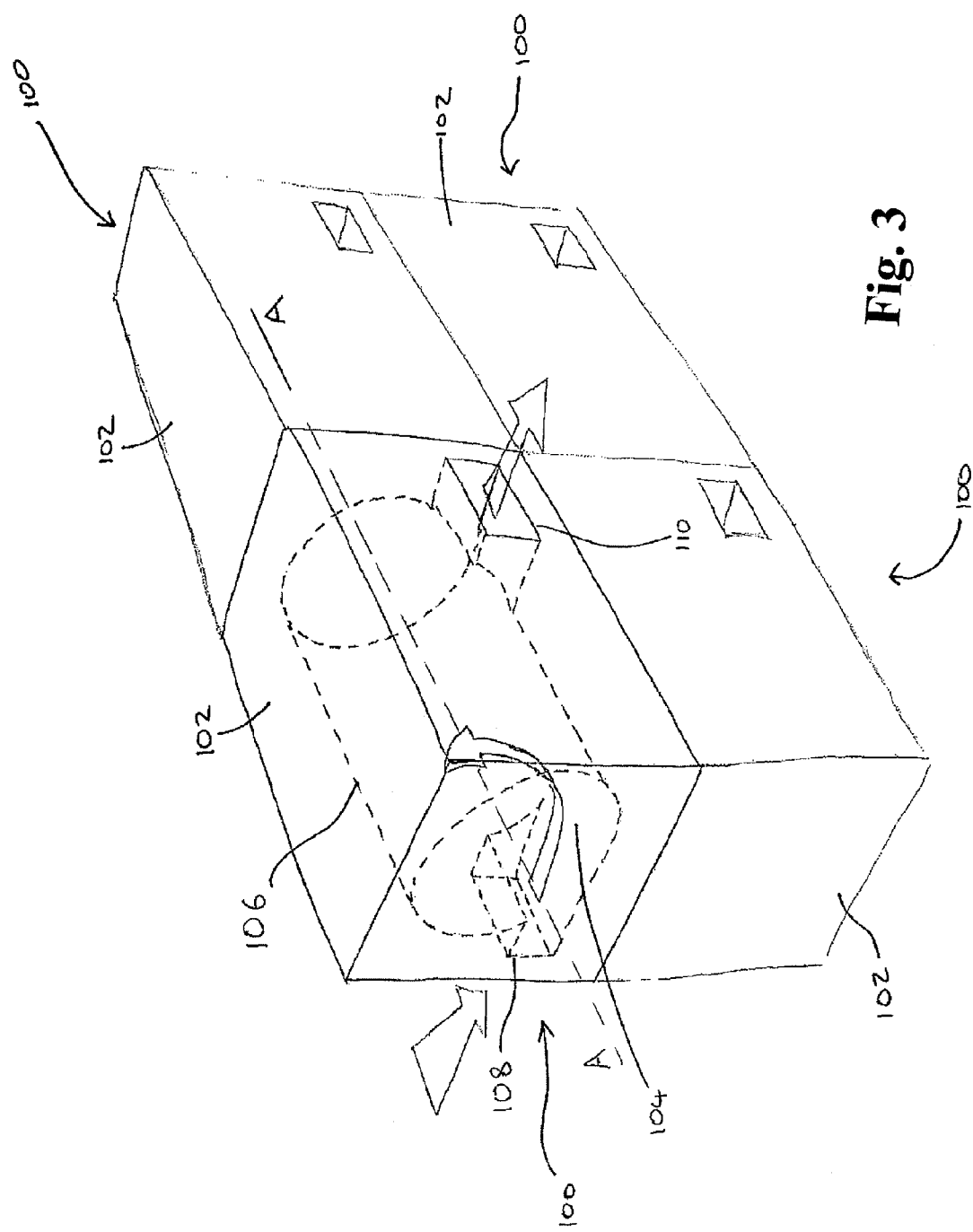
FIG. 3 is a partially cut-away perspective view of a plurality of apparatuses for coalescing particles of a first fluid entrained in a flow of a second fluid, wherein the first fluid has a higher density than the second fluid, of a separation system of a first embodiment of the present invention.

Referring to FIG. 3, a separation system for separating particles of a first fluid from a flow of a second fluid, wherein the first fluid has a higher density than the second fluid comprises a plurality of apparatuses 100 each comprising a housing 102. The apparatuses are shown assembled in a stacked configuration and only the internal parts of the top left apparatus are shown for clarity.

It should be understood that the coalescing and separation apparatuses described herein are intended to coalesce and separated a first fluid from a flow of a second fluid, wherein the first fluid has a higher density than the second fluid. For example, the apparatus could be used to coalesce particles of oil disposed in an air flow, and then separate out the oil from the airflow.

The apparatuses 100 are arranged to be disposed in a holder means 252 (FIGS. 5 to 8) and each apparatus comprises an enclosure 104 formed in a housing 102. The enclosure defines a first longitudinal axis A-A and has at least one curved wall 106 arranged to direct fluid flow in a curved path. A first inlet 108 to the enclosure 104 is provided at a first location along the longitudinal axis for enabling introduction of a fluid substantially along a tangent to curved wall 106. An outlet 110 from the enclosure is provided at a second location along the longitudinal axis A for enabling all fluid flowing in the enclosure 104 to exit substantially along a tangent to curved wall 106. Outlet 110 is the only outlet from the enclosure, such that all fluid flowing in the enclosure must exit outlet 110.

The enclosure 104 is arranged to direct fluid flow along the curved wall 106 between the first inlet 108 and outlet 110 as shown by the arrows in a substantially helical path to cause particles of a fluid disposed in a flow of a less dense fluid to coalesce and exit the outlet. For example, particles may impinge on curved wall 106 as a result of centrifugal force, where the particles coalesce. They are then carried along to the outlet 110 by the fluid flow where a stream of larger coalesced particles exits with the fluid flow.

In the embodiment shown, the curved wall 106 defines a cylinder. In a preferred embodiment, the cylinder has a diameter of 20 mm or less. This diameter has been found to be particularly suitable for separating oil particles having a size of approximately one micron or less from blow-by gases in internal combustion engines whilst being small enough to be incorporated into a car engine and also being large enough to be able to be formed from injection moulding of thermoplastics usually used to form car engine parts.

Other enclosure shapes rather than cylindrical are also possible. For example, the enclosure could be conical in shape between the first inlet 108 and outlet 110. Alternatively, the enclosure could have an elliptical or an irregular cross-section depending on the nature of particles to be coalesced. The enclosure may also have different sections of wall having different curvatures.

Figure 4:
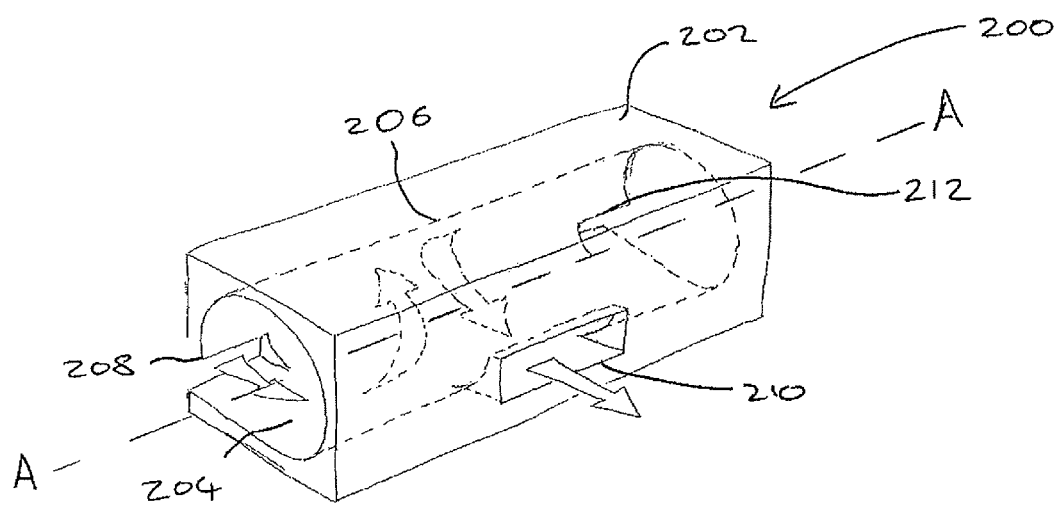
FIG. 4 is a partially cut-away perspective view of an apparatus for coalescing particles of a first fluid entrained in a flow of a second fluid of a separation system of a second embodiment of the present invention.

A second embodiment of an apparatus for coalescing particles of a first fluid flowing in a second fluid, such as liquid dispersed in a gas is shown in FIG. 4, with parts common to the embodiment of FIG. 3 shown in like reference numerals, but increased by 100.

Apparatus 200 comprises a housing 202 defining an enclosure 204 which has at least one curved wall 206. The enclosure 204 defines a longitudinal axis A-A and comprises a first inlet 208 provided at a first location along the longitudinal axis, an outlet 210 provided at a second location along the longitudinal axis and a second inlet 212 provided at a third location along the longitudinal axis. The inlets 208 and 212 enable introduction of a fluid flow substantially along a tangent to the at least one said curved wall 206 and the outlet 210 enables fluid to exit at a tangent to the curved wall 206. Outlet 210 is the only outlet from the enclosure, such that all fluid flowing in the enclosure must exit outlet 210.

The enclosure 204 is arranged to direct fluid flow along the curved wall 206 between the first inlet 208 and outlet 210 and between the second inlet 212 and outlet 210 in helical paths to coalesce particles of a first fluid dispersed in the a flow of a second, denser fluid. For example, particles of oil will impinge on the curved wall 206 and then be carried along the curved wall and exit the outlet 210 in a stream of large oil droplets in an air flow. The difference between the FIG. 4 embodiment and FIG. 3 embodiment is that two helical gas flows are permitted in the FIG. 4 embodiment.

It has been found that by having two inlets 208, 212 and a common outlet 210, a convenient, non-turbulent fluid flow exits outlet 210 without the need for a central wall separating the two fluid flows. Alternatively, a central wall can be provided if necessary. This arrangement is also particularly straightforward to manufacture by injection moulding.

Referring to FIGS. 5 to 8, a system for separating particles of a first fluid from a flow of a second fluid, wherein the first fluid has a higher density than the second fluid will now be described. Although the system shown in FIG. 5 uses the apparatus of the embodiment of FIG. 4, the apparatus shown in FIG. 3 could also be used with the system shown in FIGS. 5 to 8.

A separation system 250 comprises holder means 252 and a separation chamber 254. A lid 256 is provided for separation chamber 254. Separation chamber 254 is preferably filterless. A plurality of apparatuses 200 are arranged to be disposed in the holder means 252 such that the outlets 210 of the apparatuses are arranged to direct coalesced particles of solid or liquid in a gas flow to enter the separation chamber 254. For example, resilient means (not shown) may be provided to hold apparatuses 200 in the holder means 252. Alternatively, an adhesive or welding could be used.

Fluid flow can therefore enter inlets 208, 212 of each apparatus 202 and exit outlets 210 into the separation chamber 254. The separation chamber 254 comprises a gas outlet 258 disposed in lid 256 and a drain 260 arranged to enable particles of a first fluid separated from a second fluid in the separation chamber to exit the separation chamber 254. The separation chamber may also comprise baffles (not shown) to facilitate separation of fluid particles by the particles impinging on the baffles. Particles may also be allowed to separate out under gravity in separation chamber 254.

In the embodiment shown, the separation chamber 254 comprises at least one second curved wall 262 and a second longitudinal axis B-B extending generally vertically through the drain 260 and gas outlet 258. Second curved wall 262 enables fluid to flow in a curved path to cause particles of fluid dispersed in a less dense fluid flow to move outwardly by centrifugal force and be separated from the gas flow. In the example shown in the drawings, the separation chamber employs cyclonic separation wherein a gas flow runs along second curved wall 262, the particles separate out either through centrifugal force or gravity an exit the drain 260, whilst cleaned gas vortexes upwardly out of outlet 258.

Figure 1:
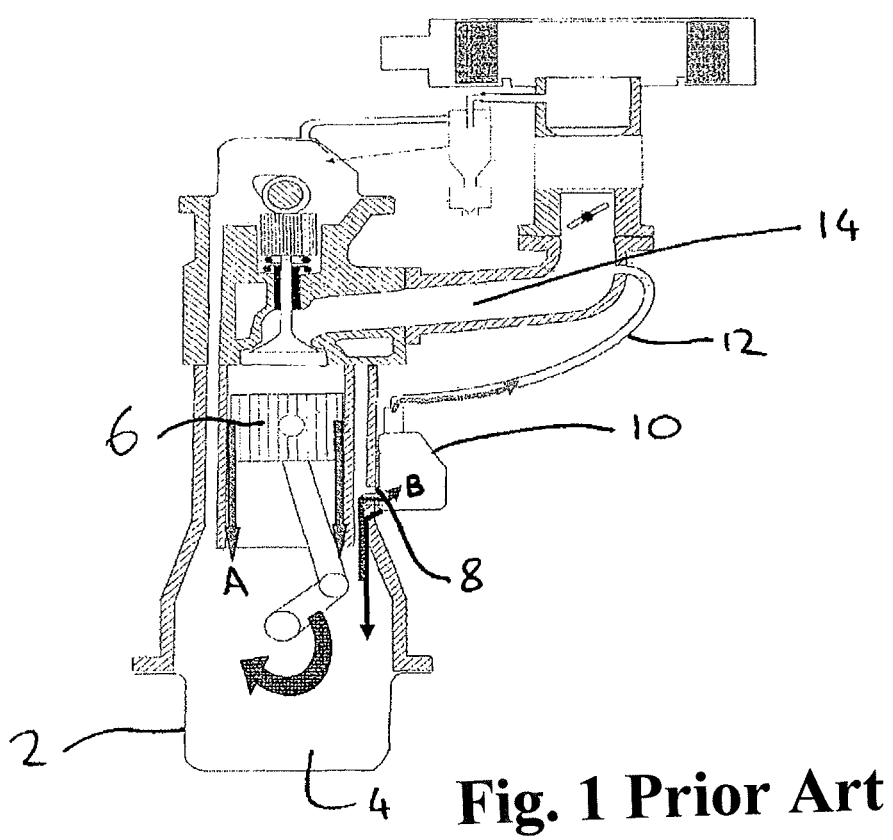
FIG. 1 is a cross-sectional view of a cylinder of an internal combustion engine comprising a prior art oil separator.
Figure 2:
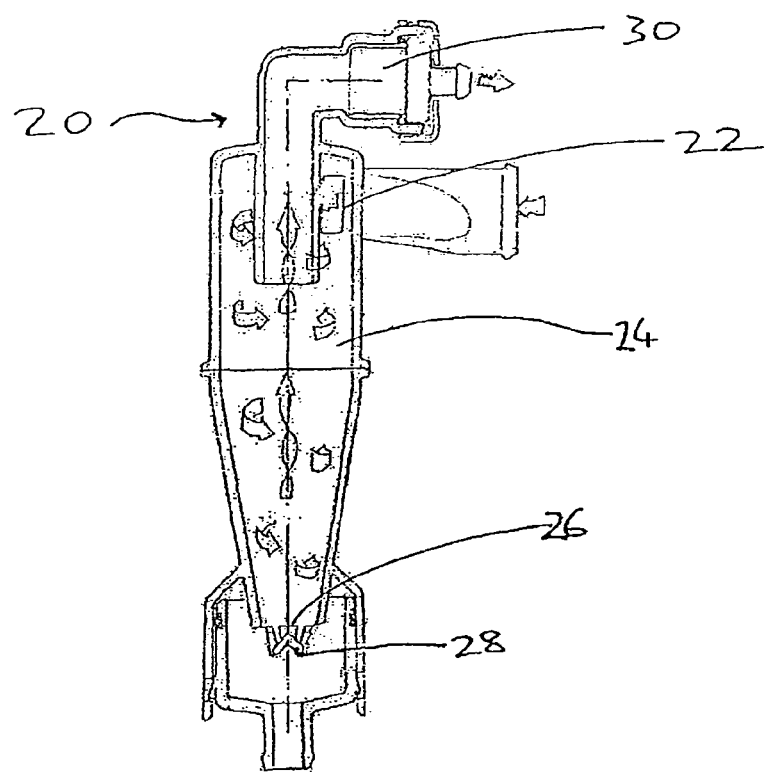
FIG. 2 is a cross-sectional view of a prior art cyclone oil separator.

The operation of the apparatus shown in FIGS. 5 to 7 will now be described by referring specifically to its use in separating oil particles from blow-by gases of an internal combustion engine. Blow-by gases are a product of combustion of an air/fuel mixture in a cylinder of an internal combustion engine. These gases can leak past piston 6 (FIG. 1) and into crank chamber 2 (FIG. 1). Blow-by gases collect a lot of oil particles from the piston rings, crank bearing and windage from the crank. The particles of oil vary in size generally from large splashes of oil to droplets having a diameter of one micron or less.

Figure 5:
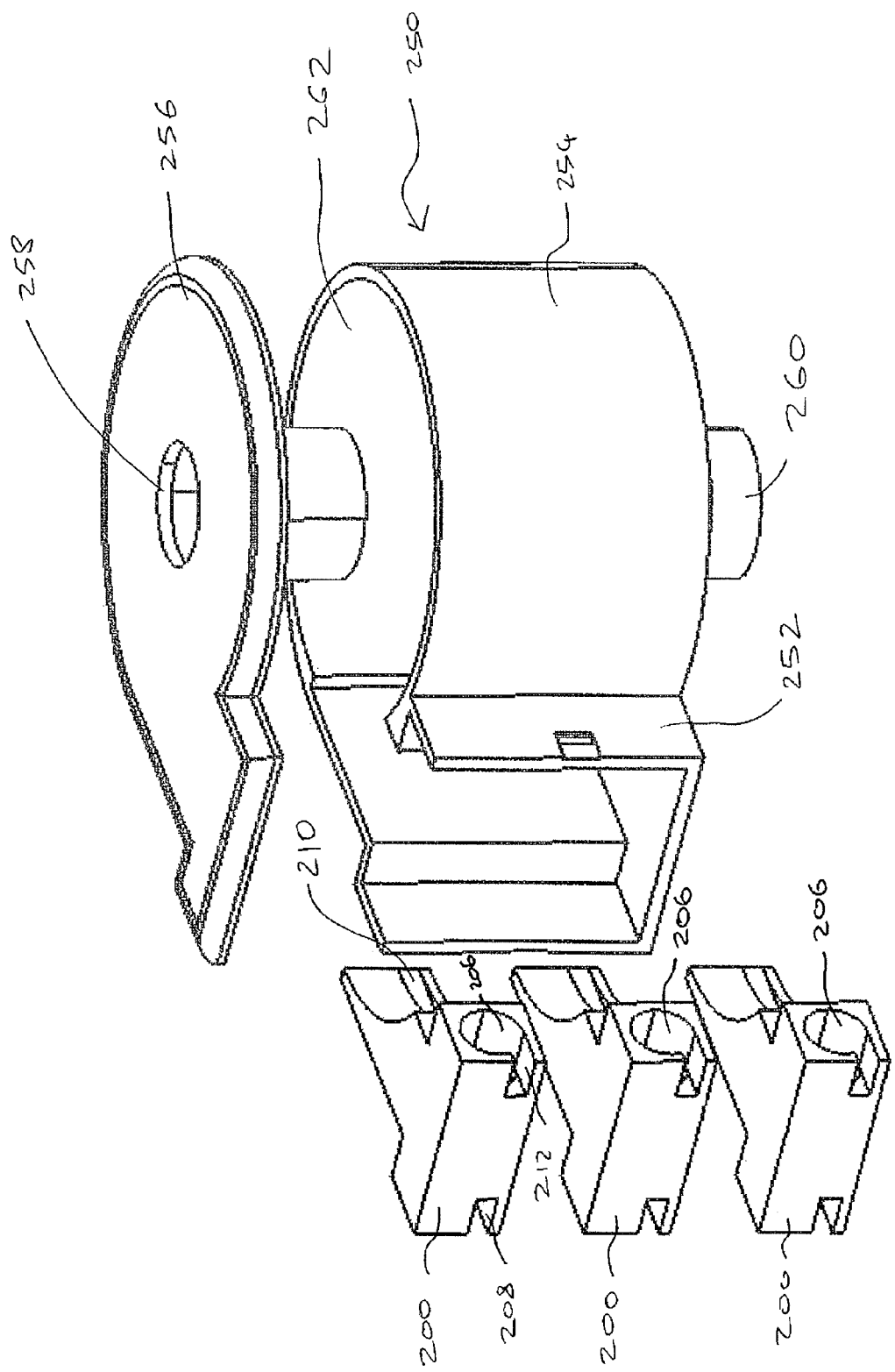
FIG. 5 is an exploded perspective view of a separation system for separating particles of a first fluid entrained in a flow of a second fluid comprising a plurality of the apparatuses of FIG. 4.
Figure 6:
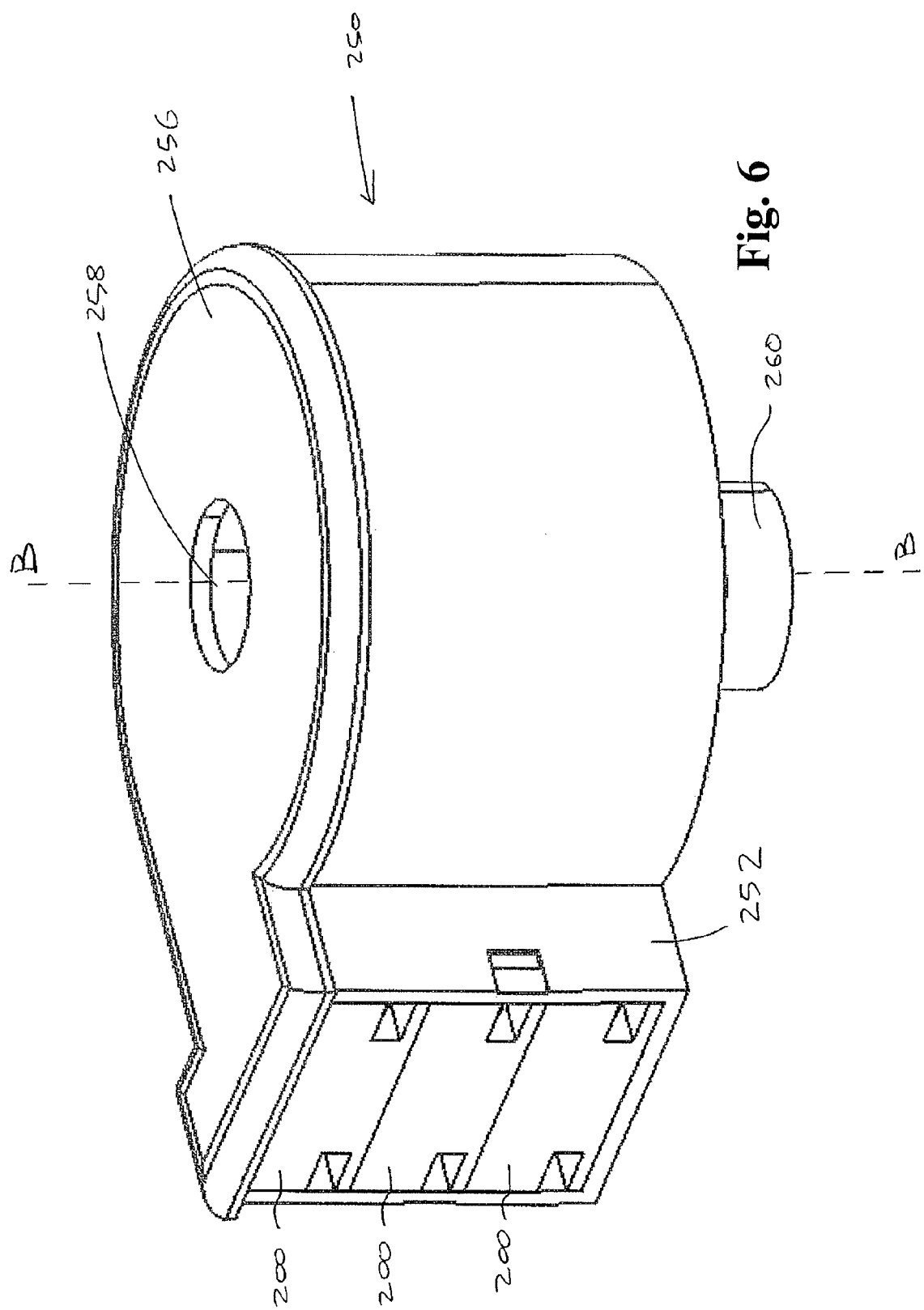
FIG. 6 is an assembled perspective view corresponding to FIG. 5.
Figure 7:
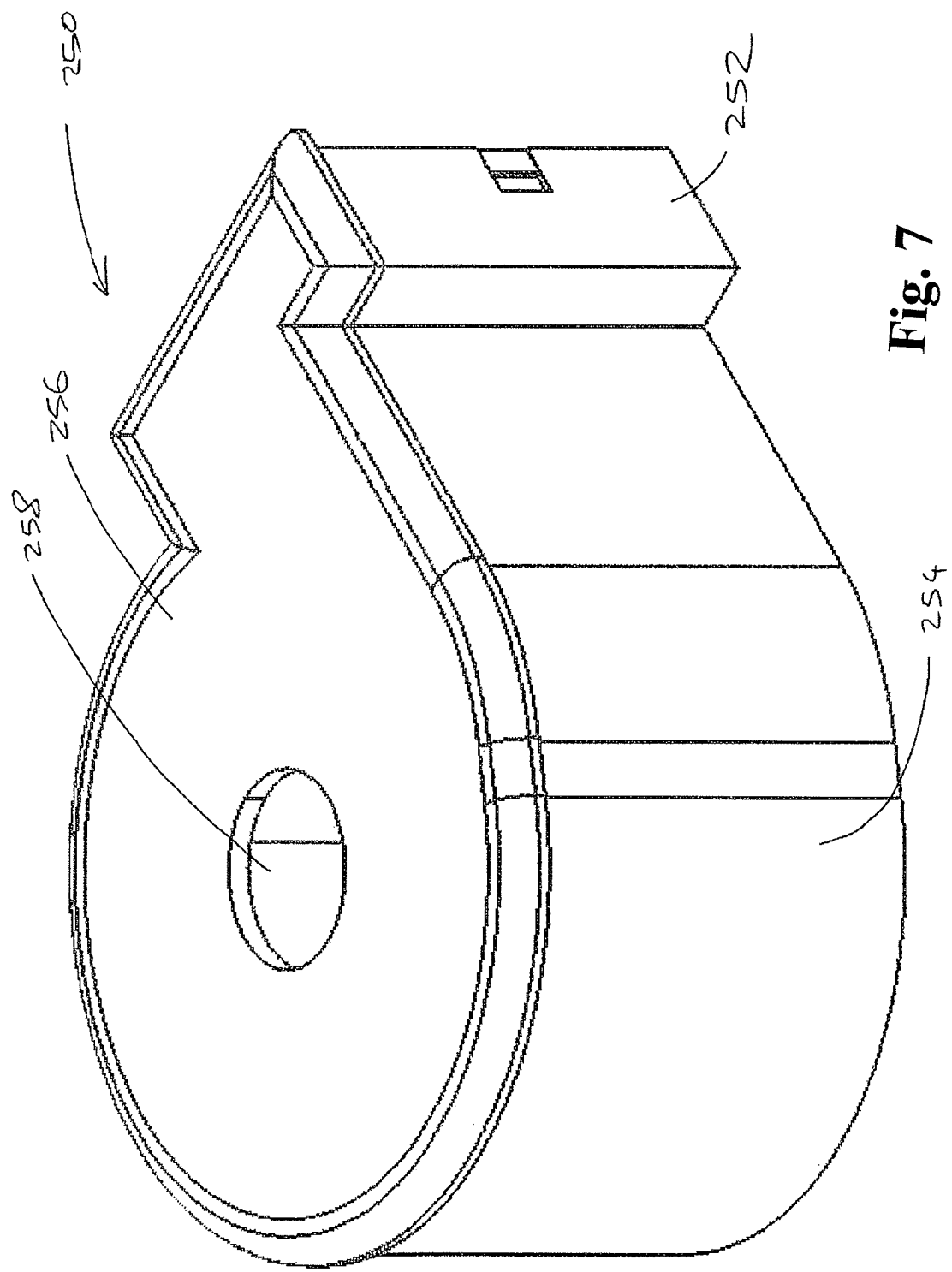
FIG. 7 is a rear view corresponding to FIG. 6.

Referring to FIGS. 5 and 6, blow-by gases having oil particles entrained therein are fed into inlets 208, 212 and are caused to move in a curved path by curved walls 206. This curved path may be generally helical as shown in the arrows in FIG. 4. Centrifugal force tends to cause the larger oil particles to collect on curved wall 206 of enclosure 204. The air flow then drags this oil to outlet 210 where it exits in a stream of large droplets. Consequently, the oil exiting outlet 210 has been coalesced into larger particles.

It will be noted from FIG. 5 that outlets 210 of the apparatuses 200 are profiled to match the curve of the second curved wall 262. Consequently, large coalesced oil droplets tend to run along the edge of the profiled outlet and directly onto the wall of the separator chamber 254. The air flow then moves around curved wall 262 and separates oil in a cyclonic fashion. Oil drains out of drain 260 and clean air vortexes upwardly out of gas outlet 258. Consequently, separation chamber 254 acts in the manner of a large, slow, low pressure drop cyclone.

The apparatus can be used with engines of different sizes by changing the number of apparatuses 200. It will be noted that the embodiment shown in FIGS. 5 to 8 uses the two inlet apparatus arrangement of FIG. 4. However, the single inlet/outlet arrangement of FIG. 3 can also be used.

Figure 8:
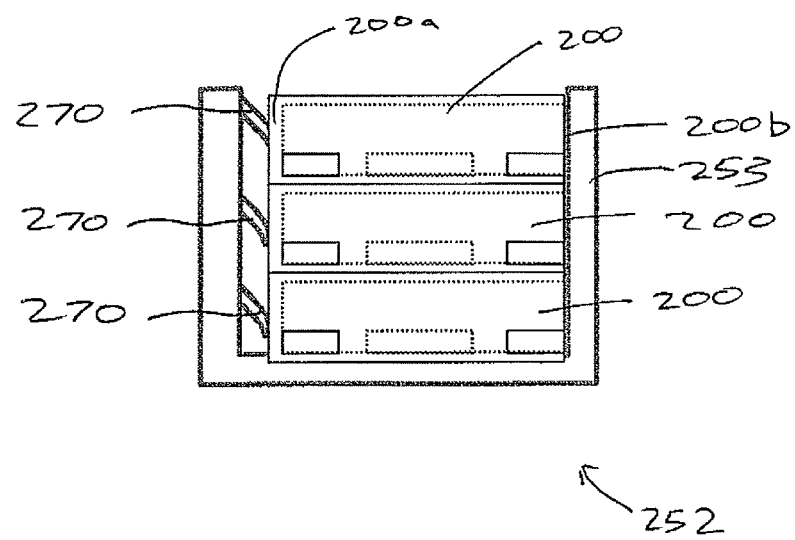
FIG. 8 is a rear view of the apparatuses for coalescing particles of a first fluid entrained in a flow of a second fluid of FIG. 4 assembled in the holder means and being biased by biasing means.

Referring to FIG. 8, three apparatuses 200 are shown assembled in holder means 252. In the example of FIG. 4, both of the ends of the enclosure 204 are formed in an open configuration. However, in the example of FIG. 6, one end 200a of each apparatus 200 is formed with a closed portion of thermoplastic. The opposite end 200b is open as shown in FIG. 4. Biasing means, such as resilient tabs 270 are formed in holder means 252 and push the closed ends 200a of the apparatuses 200 to bias the open ends 200b against a wall 253 of the holder 252 to form a seal. This arrangement ensures a substantially leak-free seal at both ends without additional sealing materials or welds and still allows for normal manufacturing tolerances.

A combination of the apparatus 100 or 200 assembled into the system 250 therefore satisfies the following requirements for an ideal oil separator:

i) It separates particles of oil in blow-by gases having a size of approximately 1 micron;

ii) It requires no servicing, i.e. it does not require the changing of filters;

iii) It causes a minimum pressure drop to minimise the risk of excessive crank case pressure;

iv) It requires no power from the engine to cause separation;

v) It has predictable performance to minimise engine development time and cost;

vi) It is scalable to suit engines of different sizes and power outputs, i.e. more or less apparatuses 100 or 200 can be assembled in holder means 252 to suit different engine sizes and power outputs;

vii) It can be packaged easily into cam covers and other engine components; and viii) It is easy to manufacture from typical thermoplastics used in engine components.

It will be appreciated by persons skilled in the art that the above embodiments have been described by way of example only and not in any limitative sense, and that various alterations and modifications are possible without departure from the scope of the invention as defined by the appended claims. For example, the apparatus can be used with any type of solid or liquid particle dispersed in any type of gas.

The invention claimed is:

1. A separation system for separating particles of a first fluid from a flow of a second fluid, wherein the first fluid has a higher density than the second fluid, the system comprising:
one separation chamber for separating particles of the first fluid from the flow of the second fluid; and
a plurality of apparatuses for coalescing particles of the first fluid entrained in the flow of the second fluid, each said apparatus comprising:
a housing;
an enclosure formed in the housing, the enclosure defining a first longitudinal axis and having at least one curved wall arranged to direct a fluid flow along said at least one curved wall in a curved path;
a first inlet to the enclosure provided at a first location along the longitudinal axis for enabling introduction of the fluid flow substantially along a tangent to said at least one curved wall; and
an outlet from the enclosure provided at a second location, remote from the first location, along the longitudinal axis for enabling exit of the fluid flow substantially along a tangent to said at least one curved wall,
wherein the enclosure is arranged to direct fluid flow along the at least one curved wall between the first inlet and the outlet to cause particles of the first fluid to coalesce and exit the outlet,
wherein the first fluid is entrained in the flow of the second fluid;
wherein said plurality of apparatuses is arranged in a configuration such that the each outlet of each said apparatus directs coalesced particles of the first fluid in the fluid flow to enter the one separation chamber to be separated from the second fluid, and
wherein the plurality of apparatuses is directly attached to the separation chamber at one side thereof.

2. A system according to claim 1, wherein at least one of said apparatuses for coalescing particles of the first fluid entrained in the flow of the second fluid further comprises:
a second inlet to the enclosure provided at a third location along the longitudinal axis for enabling introduction of a fluid flow substantially along a tangent to at least one said curved wall;
wherein the outlet from the enclosure is provided at the second location along the longitudinal axis for exit of all fluid flowing in the enclosure substantially along a tangent to at least one said curved wall and the second location is between the first and third locations; and
wherein the enclosure is arranged to direct fluid flow along the at least one curved wall between the first inlet and the outlet and between the second inlet and the outlet to cause particles of the first fluid to coalesce and exit the outlet, wherein the first fluid is entrained in the flow of the second fluid.

3. A system according to claim 2, wherein the outlet is located at the mid-point between the first and second inlets along the first longitudinal axis.

4. A system according to claim 1, wherein a portion of at least one said curved wall is substantially cylindrical.

5. A system according to claim 4, wherein the cylinder defining said portion has a diameter less than 20 millimeters.

6. A system according to claim 1, wherein each said apparatus is arranged to be mountable in a holder means in a stacked configuration.

7. A system according to claim 6, wherein at least one end of the enclosure formed in the housing of said at least one apparatus is formed in an open configuration and is arranged to be closed off by at least one wall of the holder means.

8. A system according to claim 7, further comprising a biasing device disposed in the holder means, wherein the biasing device is arranged to bias said at least one apparatus against at least one wall of the holder means.

9. A system according to claim 1, wherein the separation chamber further comprises:
a fluid outlet arranged in the separation chamber; and
a drain arranged to enable particles of the first fluid separated from the second fluid in the separation chamber to exit the separation chamber.

10. A system according to claim 9, wherein the separation chamber has a second longitudinal axis and at least one second curved wall arranged to direct fluid flow along the at least one second curved wall in a curved path to cause at least partial separation of particles of the first fluid from the second fluid.

11. A system according to claim 10, wherein the outlet of the at least one apparatus is profiled to match the curve of at least one said second curved wall.

12. A system according to claim 1, wherein the separation chamber comprises a gas outlet extending perpendicular to the outlets, and a drain formed at a side opposite to the gas outlet.

13. A system according to claim 12, wherein each outlet of the apparatuses is directly connected to the one separation chamber.

14. A system according to claim 13, wherein the plurality of apparatuses is piled.

* * * * *